(12) United States Patent
Takahashi et al.

(10) Patent No.: US 6,892,232 B2
(45) Date of Patent: May 10, 2005

(54) LOCAL NETWORKING SYSTEM FOR REGISTERING UNREGISTERED TERMINALS

(75) Inventors: Kenichi Takahashi, Koriyama (JP); Hiroki Yabe, Koriyama (JP)

(73) Assignee: Hitachi Telecom Technologies, Ltd., Koriyama (JP)

( * ) Notice: Subject to any disclaimer, the term of this patent is extended or adjusted under 35 U.S.C. 154(b) by 771 days.

(21) Appl. No.: 09/789,008

(22) Filed: Feb. 21, 2001

(65) Prior Publication Data

US 2002/0032757 A1 Mar. 14, 2002

(30) Foreign Application Priority Data

Feb. 21, 2000 (JP) ........................................ 2000-043161

(51) Int. Cl.[7] ...................... G06F 15/177; G06F 15/173
(52) U.S. Cl. ........................ 709/220; 709/221; 709/222; 709/224; 709/225; 709/227; 709/228; 709/229; 370/229; 370/241; 370/254
(58) Field of Search ................................ 709/220, 221, 709/222, 224, 225, 227, 228, 229; 370/229, 241, 254

(56) References Cited

U.S. PATENT DOCUMENTS

| | | | | |
|---|---|---|---|---|
| 4,825,463 A | * | 4/1989 | Miura | 379/355.06 |
| 5,267,307 A | * | 11/1993 | Izumi et al. | 379/354 |
| 5,793,762 A | * | 8/1998 | Penners et al. | 370/389 |
| 5,815,565 A | * | 9/1998 | Doremus et al. | 379/265.06 |
| 5,970,409 A | * | 10/1999 | Despres et al. | 455/445 |
| 6,412,003 B1 | * | 6/2002 | Melen | 709/225 |

FOREIGN PATENT DOCUMENTS

| | | | | |
|---|---|---|---|---|
| JP | 2001211255 A | * | 8/2001 | H04M/3/42 |
| WO | WO 49795 A1 | * | 8/2000 | H04M/3/54 |

* cited by examiner

*Primary Examiner*—Jeffrey Gaffin
*Assistant Examiner*—Angel L. Casiano
(74) *Attorney, Agent, or Firm*—Foley & Lardner LLP

(57) ABSTRACT

A local networking system includes a memory to store local address numbers of registered local terminals; a specified number checking unit to check, when the system receives a first dial number from an unregistered local terminal, whether the first dial number is the same as a specified number; a registration checking unit to receive, when the first dial number has been found to be the same as a specified number, a second dial number from the unregistered terminal, and to check whether a local address number corresponding with the second dial number is stored in a memory; a non-registration checking unit to receive, when such a local number has been found to be stored in memory, a third dial number from the unregistered terminal and to check whether a local address number corresponding with the third dial number is stored in memory; and a registration unit to allocate, when a local address number corresponding with the last third dial number is not stored in memory, the third dial number to the unregistered terminal as its local address number, and to store the third dial number in memory.

12 Claims, 4 Drawing Sheets

LOCAL NETWORKING SYSTEM FOR REGISTERING UNREGISTERED TERMINALS

CROSS-REFERENCES OF RELATED APPLICATION

This application claims all benefits accruing 35 U.S.C 119 from the Japanese Patent Application No. 2000-43161, filed on Feb. 21, 2000.

BACKGROUND OF THE INVENTION

1. Field of the Invention

The present invention relates to a local networking system capable of cross-connecting a plurality of member terminals in a network through registration of the plurality of member terminals into the network.

2. Description of the Related Art

If a user of an unregistered local terminal wants to register his terminal into a conventional local networking system, he must ask the manager responsible for the maintenance of that system, to manipulate a maintenance panel connected to the system so that the memory content of the system may be modified to allow thereby the terminal in question to be registered into the network.

However, for a conventional networking system to register an unregistered terminal into a network, the maintenance panel must be manipulated to modify the content of the management memory of the system, for example, the local address number to be allocated to the new terminal and the type of that terminal, the local address numbers of a relevant local group, and the operation data may be added or changed as appropriate, to allow thereby the terminal to be registered into the network. However, the manipulation of such a maintenance panel is very complicated, which poses a problem.

This invention is proposed as a remedy to the above problem, and aims at providing a local networking system that will allow an unregistered terminal to be registered into a local network by means of a simple operation.

BRIEF SUMMARY OF THE INVENTION

To attain the above object, the local networking system of this invention capable of cross-connecting a plurality of member terminals in a network comprising: a memory means to store the local address numbers of the member terminals which have registered into the system; a specified number checking means to check, when the system receives a dial number from an unregistered terminal, whether or not that number is a specified number; a registration checking means to receive, when the specified number checking means has found that the previous number is a specified number, another dial number from the unregistered terminal and to check whether or not a number corresponding with that number is stored in the memory means; a non-registration checking means to receive, when the registration checking means has found that a number corresponding with the previous number is stored in the memory means, a still other dial number from the unregistered terminal, and to check whether or not a number corresponding with the lastly received number is stored in the memory; and a local address number registration means to store, when the non-registration checking means has found that a number corresponding with the previous number is not stored in the memory, that number into the memory means as a local address number to be allocated to the unregistered terminal.

Thus, to be registered into the local networking system of this invention, an unregistered local terminal connected to the system only needs to dial a specified dial number, a local dial number of a registered local terminal, and then a local dial number which is not used by any registered member terminals. Thus, a user of an unregistered local terminal can register his terminal by simply operating on his own terminal without requiring complicated manipulation on the maintenance panel.

Specifically, with regard to the local networking system of this invention, the memory means separately stores the local address number, the type and the operation data for each of the registered member terminals; the local address number registration means, when the non-registration checking means has found a local number corresponding with a dial number given by an unregistered terminal is not stored in the memory means, takes up that dial number as a local address number to be allocated to the unregistered terminal; and then the local address number registration means allocates to the unregistered terminal, in addition to the above local address number, the type of terminal and the operation data the same with those of the registered member terminal whose local address number was notified by the unregistered terminal and found to be already registered by the registration checking means, and stores those data in the memory means.

Therefore, according to the local networking system of this invention, registration of an unregistered terminal whose type and operation data are the same with those of a certain registered terminal takes place by simply taking up a local address number to be allocated to the unregistered terminal, as well as the type and operation data of that registered terminal which are already stored in the memory, and allowing the memory means to store the data including the local address number, type and operation data for the unregistered terminal. Therefore, a user of an unregistered local terminal can register his terminal under the same condition applied to a registered terminal he nominates, by simply making appropriate dial operations on his terminal, without requiring renewed entry of the type of the terminal and its operation data.

Alternatively, to register an unregistered local terminal into a network, the local networking system of this invention further comprises: a terminal type detecting means to detect the type of the unregistered terminal; a memory means to separately store the local address number, the type and the operation data for each of the registered member terminals; and a local address number registration means which instructs, when a non-registration checking means has found a local number corresponding with a dial number given by the unregistered terminal is not stored in the memory means, a terminal type checking means to check whether or not the type of the terminal detected by the terminal type detecting means is the same with that of the terminal whose address number was found to be already registered by a registration checking means, and, when the terminal type checking means has found the two types in question are the same, allocates a dial number which was found not to be registered by the non-registration checking means to the unregistered terminal as its local address number, and further allocates the type and the operation data the same with those of a registered terminal whose local address number was found to be registered by the registration checking means, to the unregistered terminal, and instructs the memory means to store the local address number, as well as the type and the operation data as data to be allocated to the unregistered terminal.

According to the local networking system of this invention, registration of an unregistered terminal whose type and operation data are the same with those of a registered terminal takes place by simply allowing the terminal type checking means to check whether or not the detected type of the unregistered terminal is the same with that of the registered terminal, and, provided that the two terminal types in question are found to be the same, by allowing the memory means to store the local address number to be allocated to the unregistered terminal, as well as the type and operation data the same with those of the registered terminal, as the network data for the unregistered terminal. Therefore, a user of an unregistered terminal can register his terminal under the same condition applied to a registered terminal he nominates by simply making appropriate dial operations on his own terminal, without requiring renewed entry of the type of his terminal and its operation data. Moreover, erroneous registration based on the nomination of a wrong terminal type can be safely prevented.

Alternatively, to register an unregistered local terminal into a network, the local networking system of this invention further comprises a restraint noticing means which will give a restraint notice to a user of an unregistered terminal, provided that the specified number detecting means finds a dial number given as a specified number by the unregistered terminal not to be a specified number; the registration checking means finds a local address number corresponding with a dial number given as a registered local address number by the unregistered terminal is, as it is, not registered; or the non-registration checking means finds a local address number corresponding with a dial number given as an unregistered local address number by the unregistered terminal is, as it is, already registered.

The local networking system of this invention is so configured, as mentioned above, as to give a restraint notice to a user of an unregistered local terminal which is connected to the system and has entered necessary dial numbers for registration, whenever the user has entered a wrong specified number, a wrong dial number as a registered local address number, or a wrong dial number as an unregistered local address number. On receipt of this notice, the user of the unregistered terminal can recognize his current dial operation (registration operation) has been wrongly made.

The local networking system of this invention is so configured as to give a restraint notice to a user of an unregistered terminal, provided that the specified number checking means finds a dial number given by the unregistered terminal is not a specified number; the registration checking means finds another dial number given by the unregistered terminal is not registered in a memory means; the non-registration checking means finds a still other dial number given by the unregistered terminal is already registered in the memory means; or the terminal type checking means finds the type of the unregistered terminal is not the same with that of the nominated registered terminal.

Because the local networking system of this invention is so configured, as mentioned above, as to give a restraint notice to a user of an unregistered terminal which is connected to the system and has entered necessary dial numbers for registration, whenever the user has entered a wrong specified number, a wrong dial number as a registered local address number, or a wrong dial number as an unregistered local address number, or has nominated a registered terminal whose type does not match that of his terminal. On receipt of the notice, the user of the unregistered terminal can recognize his current dial operation (registration operation) has been wrongly made.

Alternatively, the local networking system of this invention further comprises a signal sound generating means to deliver, when it detects a call request from an unregistered terminal, a signal sound different from the signal sound used in common communication to the unregistered terminal.

Because the local networking system of this invention is so configured, as mentioned above, as to deliver, when it detects a connection from an unregistered terminal, a signal sound different from the sound used in common communication, a user of the unregistered terminal can recognize by listening to the sound that his terminal is not yet registered.

The local networking system of this invention for cross-connecting a plurality of member terminals comprises a signal sound generating means which, when the system detects a call request from a registered terminal, delivers a signal sound to the terminal, and which, when the system detects a call request from an unregistered terminal, delivers another signal sound different from the previous sound to that unregistered terminal.

Because the local networking system of this invention is so configured, as mentioned above, as to deliver, when it detects a call request from an unregistered terminal, a signal sound different from the sound used in common communication, a user of the unregistered terminal can recognize by listening to the signal sound that his terminal is not yet registered.

DETAILED DESCRIPTION OF THE INVENTION

Figure 1:
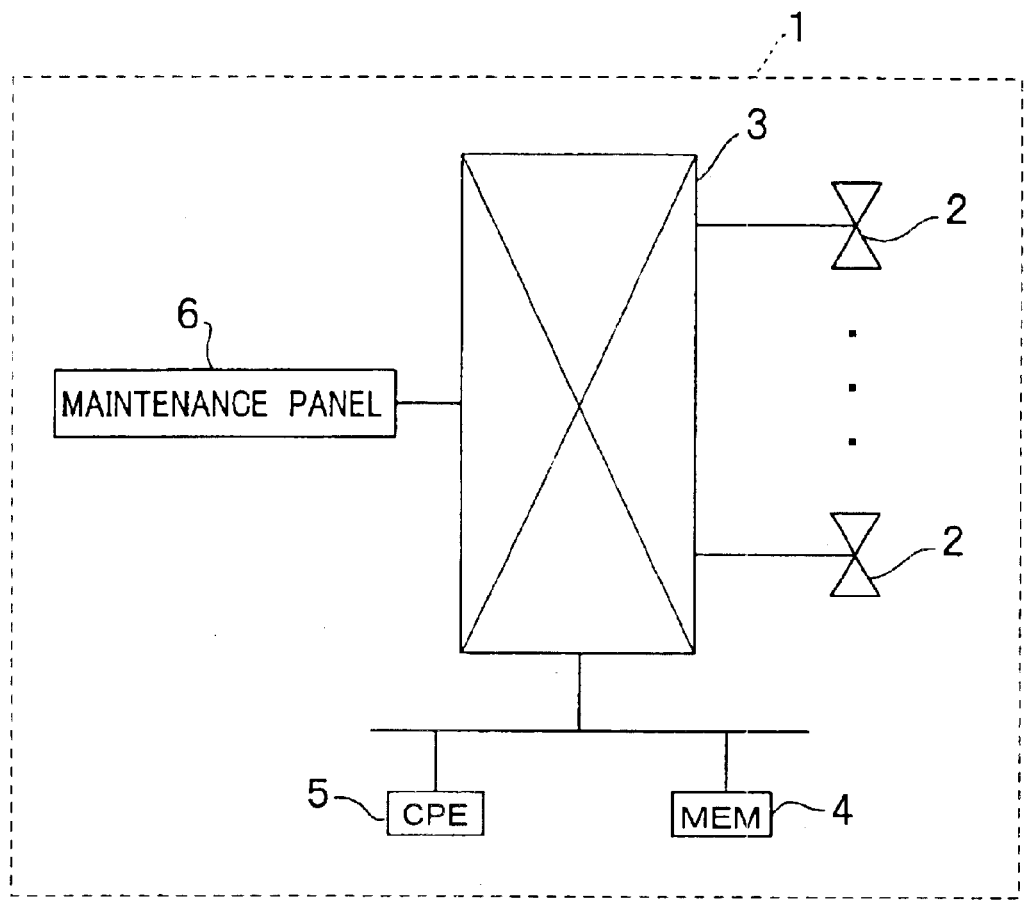
FIG. 1 is a block diagram to illustrate the simplified structure of a local networking system representing an embodiment of this invention.

The local networking system representing an embodiment of this invention will be described below with reference to the attached drawings. FIG. 1 is a block diagram to illustrate the simplified structure of a local networking system representing an embodiment of this invention.

The local networking system 1 as depicted in FIG. 1 is provided with, in addition to a plurality of local terminals 2 to be cross-connected, a routing switch 3 which connects not only the local terminals 2 with each other, but those terminals communicably with public networks; various programs including a program required for controlling the cross-connection achieved by this local networking system 1; a memory 4 (MEM) to store the data of local stations and a variety of tables; a central processing equipment 5 (CPE) to control the overall operation of this local networking system 1; and a maintenance panel 6 to feed the data of local stations through the routing switch 3.

A local terminal 2 connected to the local networking system 1 for cross-connection in a local network is a local terminal 2A which has been registered into the local networking system 1. The data about the local terminal 2A are stored in the memory 4 as its local terminal control data 20. An unregistered local terminal 2B is a local terminal that is not yet registered into the local networking system 1.

Figure 2:
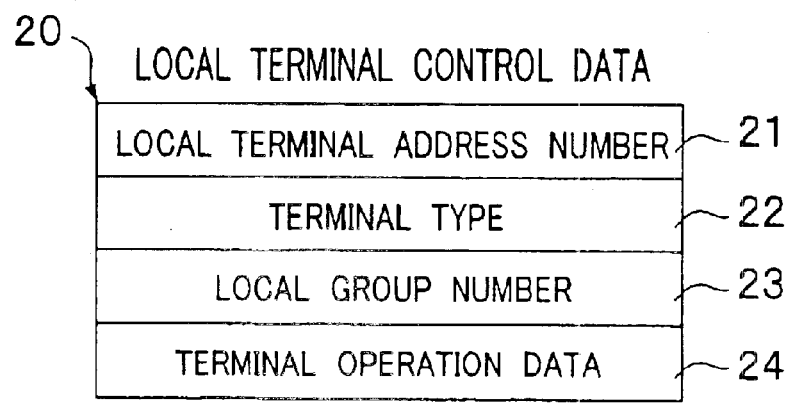
FIG. 2 illustrates the arrangement of local terminal control data stored in the memory of the local networking system representing an embodiment of this invention.

The memory 4 separately stores the local terminal control data 20 for each of registered local terminals 2A. FIG. 2 illustrates the arrangement of local terminal control data stored in memory 4. The memory means as described in claims corresponds with this memory 4.

The local terminal control data 20 as depicted in FIG. 2 includes, for a given local terminal 2A, its local address number 21, the type of the terminal 22 such as an ordinary telephone, a multi-functional telephone, a facsimile, etc., the address number of a group 23 to which the terminal belongs, and the terminal operation data 24 including the type of call signal sound, the functions assigned to function keys, the terminal operation data of the relevant local group, etc.

Figure 3:
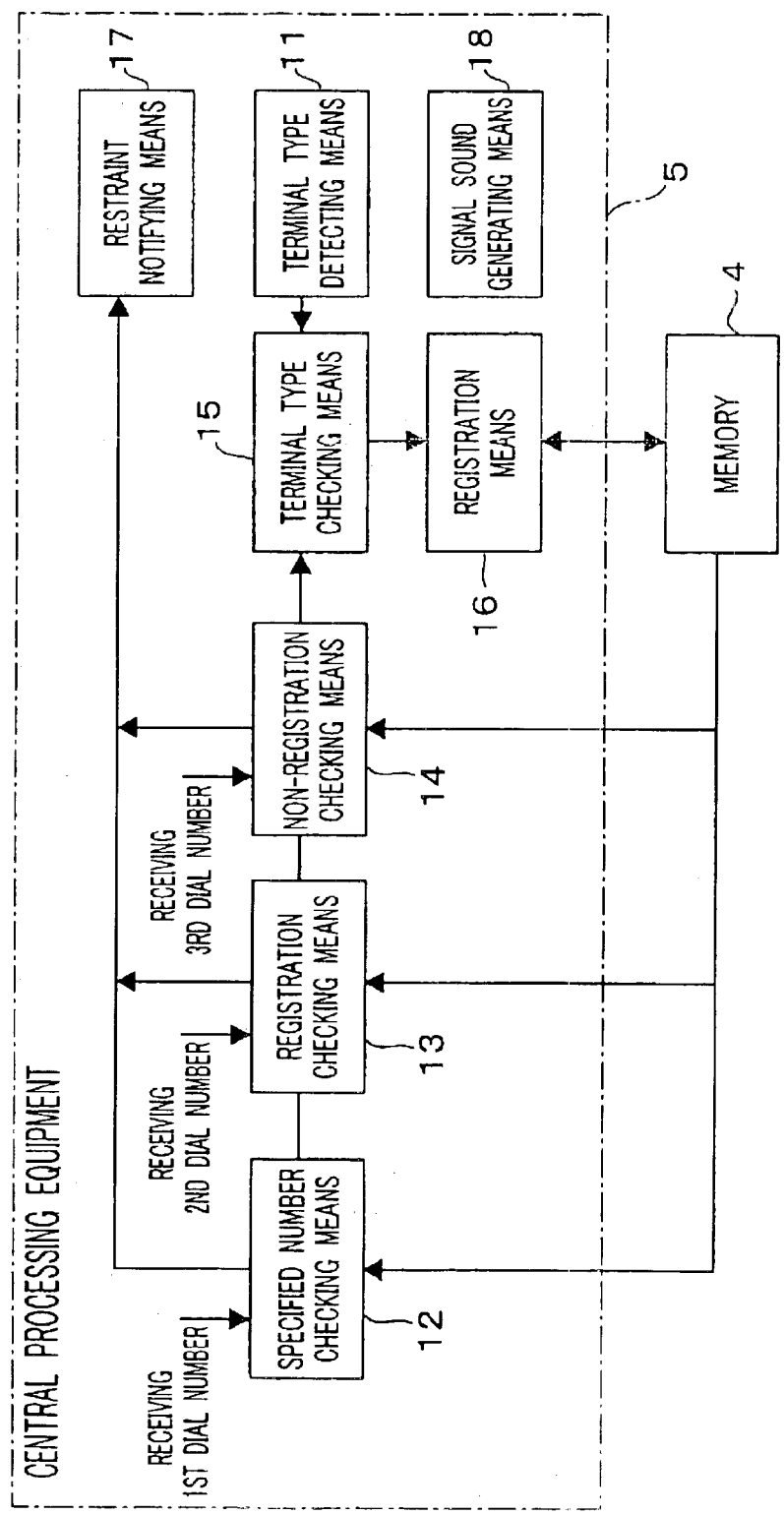
FIG. 3 is a block diagram to illustrate the simplified composition of a central processing equipment of the local networking system representing an embodiment of this invention.

FIG. 3 is a block diagram to illustrate the simplified composition of the central processing equipment 5.

The central processing equipment 5 as depicted in FIG. 3 comprises: a terminal type detecting means 11 which detects the terminal type, when an unregistered terminal 2B connected to the local networking system 1 gains access to the network; a specified number checking means 12 which checks, when the local networking system 1 receives a dial number from the unregistered terminal 2B, whether or not the dial number is a specified number (special number); a registration checking means 13 which receives, when the specified number checking means 12 finds the number in question is the specified number, another dial number from the unregistered terminal 2B, and checks whether or not a local address number corresponding with the dial number is already stored in a memory 4; a non-registration checking means 14 which receives, when the registration checking means 13 finds a local address number corresponding with the previous dial number is already stored in memory 4, a still other dial number from the unregistered terminal 2B, and checks whether or not a local address number corresponding with the dial number is already stored in memory 4; a terminal type checking means 15 which checks, when the non-registration checking means 14 finds a local address number corresponding with the last dial number is not yet stored in memory 4, whether or not the terminal type detected by the terminal type detecting means 11 is the same with that of a registered terminal 2A whose local address number stored in memory 4 was found to be the same with the second dial number by the registration checking means 13; and a registration means 16 which allocates, when the terminal type checking means 15 finds the two terminal types in question are the same, the dial number which was found not to be stored in memory 4 by the non-registration checking means 14, to the unregistered terminal 2B as its local address number, and further allocates the terminal type 22, the group address number 23 and the operation data 24 the same with those of a registered terminal 2A whose local address number stored in memory 4 was found to be the same with the second dial number by the registration checking means 13, to the unregistered terminal 2B, and instructs memory 4 to store the local address number 21, terminal type 22, group address number 23 and operation data 24 as local terminal control data 20 for that unregistered terminal 2B. The local address number registering means as described in the claims corresponds with the terminal type checking means 15 and the registration means 16.

The central processing equipment controls a line circuit not illustrated here through a routing switch 3 so that a signal sound generating means 18 may generate a sound signaling common communication on some occasions, and another sound generating means (restraint notifying means) 17 may generate a sound signaling restraint on other occasions.

Figure 4:
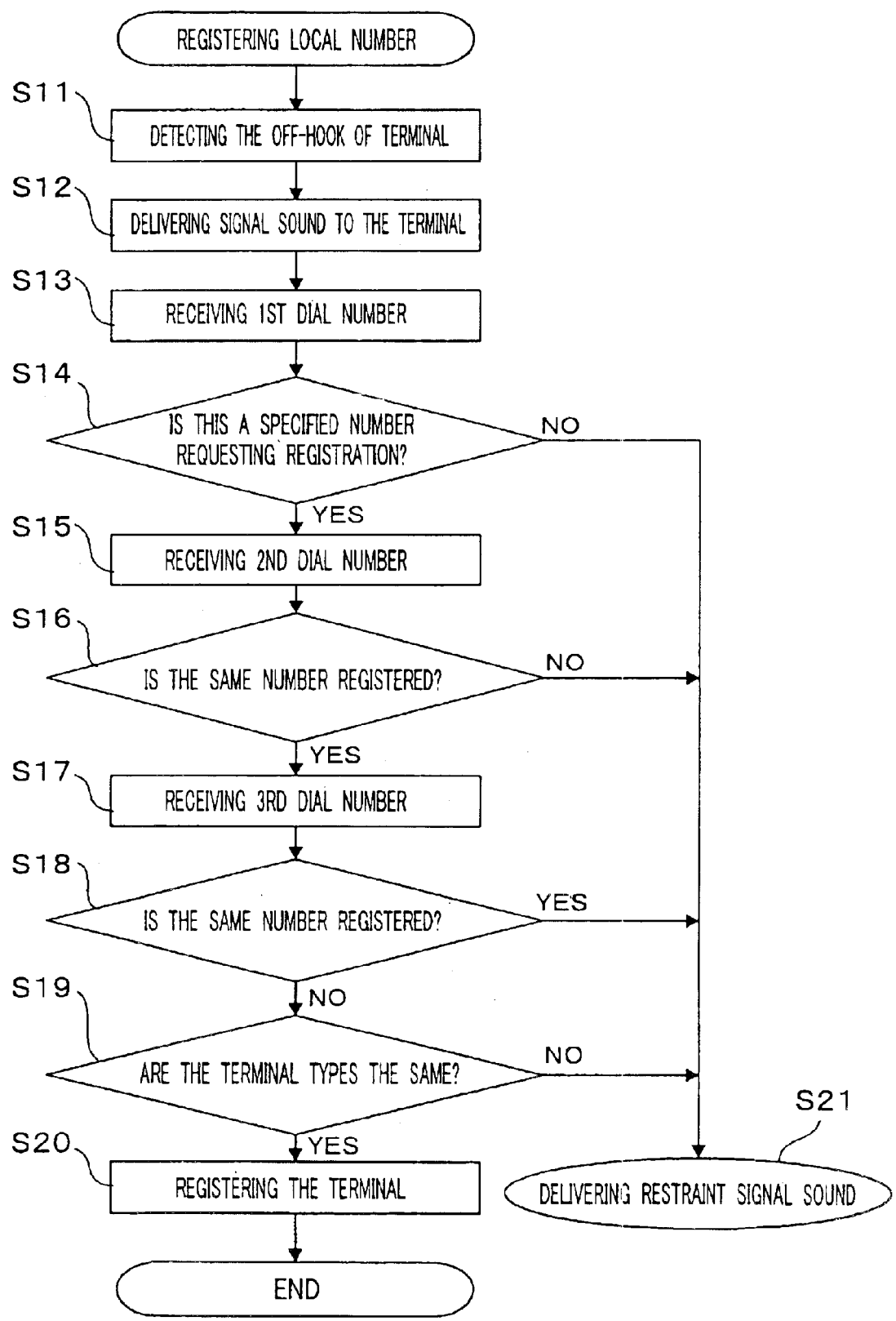
FIG. 4 is a flowchart to illustrate the steps taken by the central processing equipment when the local networking system representing an embodiment of this invention tries to register a terminal into its local network.

Next, the operation of the local networking system 1 representing an embodiment of this invention will be described. FIG. 4 is a flowchart to illustrate the steps taken by the central processing equipment 5 when the local networking system 1 representing an embodiment of this invention tries to register a terminal into its local network.

The steps required for registration of a terminal into a local network as depicted in FIG. 4 is the steps required for registering an unregistered terminal 2B into the local networking system 1 as its member station.

The central processing equipment 5 as depicted in FIG. 4, when it detects a connection from an unregistered terminal 2B, that is, an off-hook of the unregistered terminal 2B (step S11), delivers via a signal sound generating means 18 a signal sound (dial tone) different from that used in common communication to the unregistered terminal 2B (step S12). Incidentally, the user of the unregistered terminal 2B can recognize by listening to the signal sound that his terminal 2B is not yet registered.

The specified number checking means 12 of the central processing equipment 5 receives a dial number from the unregistered terminal 2B (step S13), and checks whether or not the dial number is a specified number coding for registration (step S14).

If the number is found to correspond with the specified number, the registration checking means 13 of the central processing equipment 5 receives another dial number from the unregistered terminal 2B (step S15), and checks whether or not a local address number corresponding with the newly received dial number is stored in a memory 4 (or whether or not the newly received number is actually used for communication by a certain member station as its local address number)(step S16).

If a number corresponding with the dial number in question is found to be stored in memory 4, the non-registration checking means 14 of the central processing equipment 5 receives a still other dial number from the unregistered terminal 2B (step S17), and checks whether or not a local address number corresponding with this dial number is stored in memory 4 (step S18).

If a local address number corresponding with the last dial number is found not to be stored in memory 4, the terminal type checking means 15 of the central processing equipment 5 checks whether or not the type of the unregistered terminal 2B is the same with that of a registered terminal 2A whose local address number was found at step S16 to correspond with the second dial number (step S19). Incidentally, the type of the unregistered terminal 2B is detected by the terminal type detecting means 11, and the type of a registered terminal is obtained from the local terminal control data 20 of that terminal stored in memory 4.

The registration means 16 of the central processing equipment 5, when the terminal types in question are found to be the same at step S19, allocates the dial number which was found not to be stored in memory 4 at step S18 to the unregistered terminal 2B as its local address number 21, and further copies the terminal type 22, the group address number 23 and the operation data 24 of a registered terminal 2A whose local address number stored in memory 4 was found to be the same with the second dial number at step S19, and instructs memory 4 to store, in addition to the local address number 21, the copied terminal type 22, group address number 23, and operation data 24 as the local terminal control data 20 of the unregistered terminal 2B (step S20), to complete registration of the unregistered terminal.

Further, the central processing equipment 5, when the dial number given by the unregistered terminal 2B was found not to be a specified number, controls the line circuit so as to deliver a sound signaling restraint to the unregistered terminal 2B, thereby informing the user of the terminal of his having entered a wrong dial number (step S21).

Furthermore, the central processing equipment 5, when a local address number corresponding with the dial number currently received was found not to be registered at step S16, moves to step S21 in order to deliver a sound signaling restraint to the unregistered terminal 2B.

Still further, the central processing equipment 5, when a local address number corresponding with the dial number currently received was found to be registered at step S18, moves to step S21 in order to deliver a sound signaling restraint to the unregistered terminal 2B.

Still further, the central processing equipment 5, when the terminal types in question were found not to be the same at step S19, moves to step S21 in order to deliver a sound signaling restraint to the unregistered terminal 2B.

Figure 5:
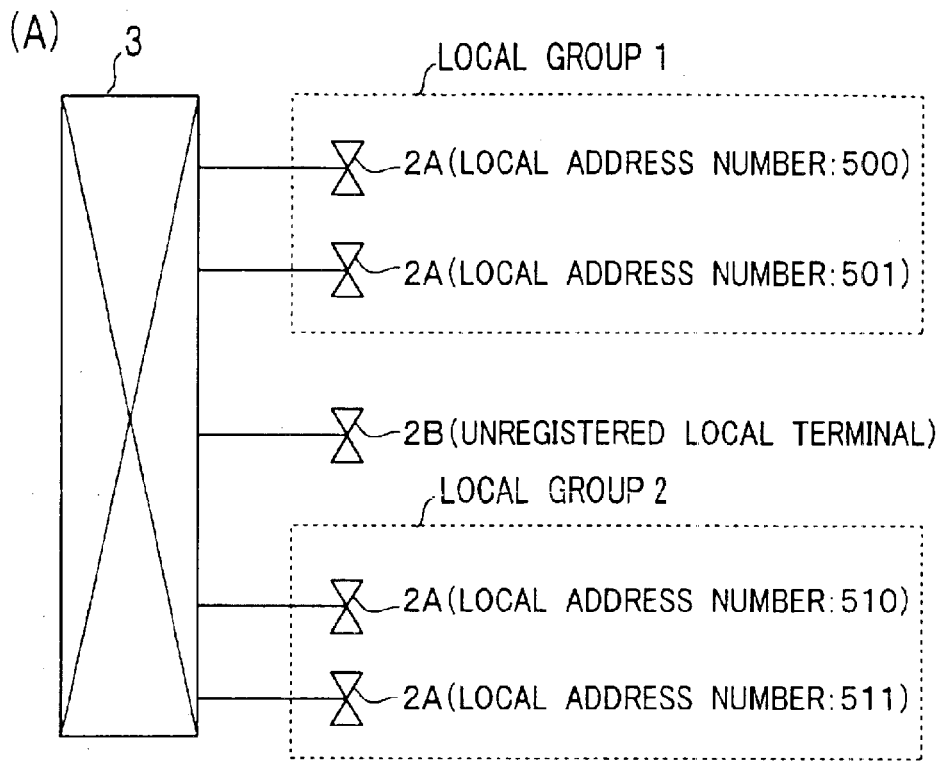
FIG. 5 is a simplified diagram to illustrate, in terms of an example, how registration of a terminal into a local network is achieved in accordance with the steps as depicted in FIG. 4.
Figure 5:
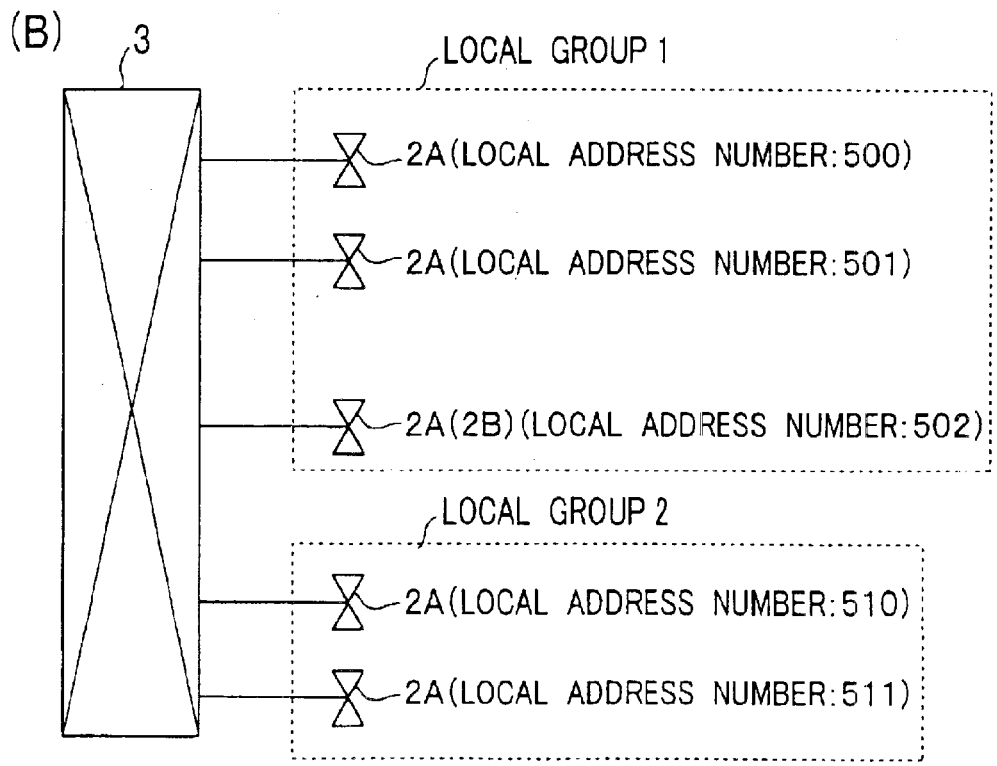

FIG. 5 is a simplified diagram to illustrate, in terms of an example, how registration of a terminal into a local network is achieved in accordance with the steps as depicted in FIG. 4.

In this example, as shown in FIG. 5(A), the local networking system 1 includes group 1 composed of local terminals 2A having local address numbers "500" and "501," and group 2 composed of local terminals 2A having local address numbers "510" and "511," for cross-connection through the same network, and separately stores the local terminal control data 20 for each of the local terminals 2A in a memory 4. Further, an unregistered terminal 2B has a type the same with that of the local terminal 2A having the local address number of "500."

Take, as an example, a case where a user of the unregistered terminal 2B wants to register his terminal into group 1. He connects the unregistered terminal 2B to the local networking system 1, receives a signal sound different from the one used in common communication, and dials a number corresponding with a specified number.

Then, the user dials a number "500" or the local address number of a local terminal 2A belonging to group 1. After dialing the number, the user then dials an unregistered number, e.g., "502." Then, the number "502" (21), as well as the terminal type 22, local group number "1" (23), and local terminal operation data 24 the same with those of the terminal 2A having the local address number "500" are stored in memory 4 as the local terminal control data 20 for this unregistered terminal 2B. Thus, this hitherto unregistered terminal 2B is now registered as a member terminal of group 1.

As seen from above, according to this embodiment, for an unregistered terminal 2B to be registered into the local networking system 1 of this invention, a user of the unregistered terminal 2B simply needs to dial a specified number, a local address number of a registered terminal 2A and an unregistered local address number in order. Thus, registration is achieved by simple operations from the unregistered terminal 2B without requiring complicated manipulations on the maintenance panel.

Further, according to this embodiment, before an unregistered terminal 2B is registered after being given the terminal type 22, local group number 23, and terminal operation data 24 of a registered terminal 2A, it is checked whether or not its terminal type is the same with that of the registered terminal 2A, and, provided that the terminal types in question are found to be the same, a local address number 21 to be allocated to the unregistered terminal 2B, and the terminal type 22, local group number 23 and terminal operation data 24 of the registered terminal 2A will be stored in memory 4 as the local address number 21, terminal type 22, local group number 23 and terminal operation data 24 to be allocated to the unregistered terminal 2B. Therefore, it is possible not only to register an unregistered terminal 2B under the same condition applied to a registered terminal 2A through simple dial operations from the unregistered terminal 2B without requiring complicated manipulations on the maintenance panel, but to securely prevent the occurrence of defective registration based on the nomination of a registered terminal of a wrong terminal type.

Furthermore, according to this embodiment, if an unregistered terminal 2B connected to the local networking system 1 gives, during registration operations, a wrong specified number, a wrong local address number of a registered terminal 2A, or a wrong unregistered number, or if the type of the unregistered terminal 2B is found not to be the same with that of the nominated registered terminal 2A, the system will give a sound signaling restraint to the unregistered terminal 2B. Therefore, the user of the unregistered terminal 2B can recognize by listening to this sound signaling restraint his current dial operation (registration operation) has been wrongly made.

Still further, according to this embodiment, because the local networking system 1 is so configured as to deliver, when it detects a connection from an unregistered terminal 2B, a signal sound different from the sound used in common communication, the user of the unregistered terminal 2B can recognize by listening to this sound that his terminal is not yet registered.

As seen from above, according to this embodiment, even if a local terminal 2 belonging to a local group in the network of the local networking system 1 must be moved to another group, or if a new local terminal 2 must be added to the local group, removal or addition of such a local terminal can be achieved through simple operations from the local terminal 2.

According to this embodiment, registration of an unregistered terminal 2B connected to the local networking system 1 is achieved based on a specified number, a local address number of a registered terminal 2A and an unregistered local address number delivered in order by the unregistered terminal 2B. However, registration of an unregistered terminal 2B into the local networking system 1 may be achieved even if the entry of a local address number of a registered terminal 2A is omitted.

To put it specifically, if an unregistered terminal 2B connected to the local networking system 1 dials a specified number and an unregistered local address number in order, the registration means 16 will take up the unregistered local address number to use it as a local address number to be allocated to the unregistered terminal 2B, and then default data previously stored as the operation data for an unregistered terminal 2B, and stores those data in memory 4.

This arrangement will make it possible to prepare, through simple operations, the local terminal control data 20 necessary for the network operation of an unregistered terminal 2B and to store them in memory 4, and thus to flexibly meet the condition required for the introduction of a new terminal 2B.

According to the local networking system of this invention configured as described above, it is possible to register an unregistered terminal into its network through simple dial operations from the unregistered terminal without requiring complicated manipulations.

What is claimed is:

1. A local networking system for cross-connecting a plurality of local terminals in its network comprising:
   a memory means to store the local address numbers of the local terminals that have registered into the local networking system;
   a specified number checking means to check, when the local networking system receives a first dial number from an unregistered local terminal, whether or not the first dial number is a specified number;
   a registration checking means to receive, when the first dial number is found to be the same with the specified number by the specified checking means, a second dial number from the unregistered local terminal, and to check whether or not a local address number corresponding with the second dial number is stored in the memory means;
   a non-registration checking means to receive, when a local address number corresponding with the second dial number is found to be stored in the memory means by the registration checking means, a third dial number from the unregistered local terminal, and to check whether or not a local address number corresponding with the third dial number is stored in the memory means; and
   a local address number registering means to allocate, when a local address number corresponding with the third dial number is found not to be stored in the memory means by the non-registration checking means, the third dial number to the unregistered local terminal as its local address number, and to store the third dial number as such in the memory means.

2. A local networking system as described in claim 1, wherein:
   the memory means separately stores the local address number, the terminal type, and the operation data of each of the plurality of registered local terminals; and
   the local address number registering means allocates, when a local address number corresponding with the second dial number is found not to be stored in the memory means by the non-registration checking means, the second dial number to the unregistered local terminal as its local address number, and further allocates, to the unregistered terminal, the terminal type and the operation data of a registered terminal whose local address number has been found to be stored in the memory means by the registration checking means, and stores those data in the memory means to use them as the local address number, terminal type, and operation data of the unregistered terminal.

3. A local networking system as described in claim 2, further comprising a restraint notifying means which delivers a restraint notice to the unregistered terminal, whenever the first dial number has been found not to be the same with a specified number by the specified number checking means, a local address number corresponding with the second dial number has been found not to be stored in the memory means by the registration checking means, or a local address number corresponding with the third dial number has been found to be stored in the memory means by the non-registration checking means.

4. A local networking system as described in claim 2, further comprising a signal sound generation means which delivers, whenever the system detects a call request from an unregistered terminal, a signal sound different from a signal sound used in common communication to the unregistered terminal.

5. A local networking system as described in claim 1, further comprising a terminal type detecting means to detect the type of an unregistered terminal wherein:
   the memory means separately stores the local address number, terminal type and operation data of each of the registered local terminals; and
   the local address number registering means comprises a terminal type checking means which checks, when a local address number corresponding with the second dial number has been found not to be stored in the memory means by the non-registration checking means, whether or not the terminal type detected by the terminal type detecting means is the same with that of a registered terminal whose local address number has been found to be stored in the memory means by the registration checking means, and
   a registration means which allocates, when the terminal types in question have been found to be the same by the terminal type checking means, a local address number corresponding with the second dial number and found not to be stored in the memory means by the non-registration checking means, to the unregistered local terminal as its local address number, and further allocates, in addition to the local address number, the terminal type and the operation data of a registered terminal whose local address number has been found to be stored in the memory means by the registration means, to the unregistered terminal, to use them as its local address number, terminal type, and operation data, and stores them as such in the memory means.

6. A local networking system as described in claim 5, further comprising a restraint notifying means which delivers a restraint notice to the unregistered terminal, whenever the first dial number has been found not to be the same with a specified number by the specified number checking means, a local address number corresponding with the second dial number has been found to be stored in the memory means by the non-registration checking means, or the type of the unregistered terminal has been found not to be the same with that of the nominated registered terminal by the terminal type checking means.

7. A local networking system as described in claim 6, further comprising a signal sound generation means which delivers, whenever the system detects a call request from an unregistered terminal, a signal sound different from a signal sound used in common communication to the unregistered terminal.

8. A local networking system as described in claim 5, further comprising a signal sound generation means which delivers, whenever the system detects a call request from an unregistered terminal, a signal sound different from a signal sound used in common communication to the unregistered terminal.

9. A local networking system as described in claim 1, further comprising a restraint notifying means which delivers a restraint notice to the unregistered terminal, whenever the first dial number has been found not to be the same with a specified number by the specified number checking means, a local address number corresponding with the second dial number has been found not to be stored in the memory means by the registration checking means, or a local address number corresponding with the third dial number has been found to be stored in the memory means by the non-registration checking means.

10. A local networking system as described in claim 9, further comprising a signal sound generating means that delivers, whenever the system detects a call request from an unregistered terminal, a signal sound different from a signal sound used in common communication to the unregistered terminal.

11. A local networking system as described in claim 1, further comprising a signal sound generating means which delivers, whenever the system detects a call request from an unregistered terminal, a signal sound different from a signal sound used in common communication to the unregistered terminal.

12. A local networking system for cross-connecting a plurality of local terminals in its network comprising:

a memory means to store the local address numbers of the local terminals that have registered into the local networking system; and a signal sound generating means which delivers, whenever the system detects a call request from a local terminal registered to the system, a first signal sound to the local terminal, wherein the signal sound generating means delivers, whenever the system detects a call request from a local terminal unregistered to the system, a second signal sound different from the first signal sound, to the unregistered terminal.

\* \* \* \* \*